United States Patent
Nonogaki

[11] 4,162,822
[45] Jul. 31, 1979

[54] ZOOM LENS ASSEMBLY WITH RESTRICTABLE ZOOMING RANGE

[75] Inventor: Masahiko Nonogaki, Kōnan, Japan

[73] Assignee: Elmo Company Limited, Nagoya, Japan

[21] Appl. No.: 782,784

[22] Filed: Mar. 30, 1977

[30] Foreign Application Priority Data

Apr. 9, 1976 [JP] Japan .................. 51-45012[U]

[51] Int. Cl.² ............... G02B 7/10; G02B 15/18
[52] U.S. Cl. ............................. 350/187; 350/255
[58] Field of Search .............. 350/187, 186, 184, 44

[56] References Cited
U.S. PATENT DOCUMENTS 3,970,368  7/1976  Von Belvard .............. 350/187

Primary Examiner—Jon W. Henry
Attorney, Agent, or Firm—Wenderoth, Lind & Ponack

[57] ABSTRACT

A zoom lens assembly for photographic cameras, particularly for movie cameras, has a focussing ring, a zooming ring and a fixed-tube for supporting these rings as well as associated lenses. A locking device is provided for locking the focussing ring at the hyperfocal position and at the same time for restricting the zooming range to one in which a sharp image can be produced independently from the zooming operation with the focussing lens being set at the hyperfocal position.

1 Claim, 3 Drawing Figures

ZOOM LENS ASSEMBLY WITH RESTRICTABLE ZOOMING RANGE

BACKGROUND OF THE INVENTION

This invention relates in general to a photographic camera and particularly to a zoom lens assembly especially for a movie camera.

In a zoom lens assembly including a focussing ring, a zooming ring and a fixed-tube for supporting these rings and associated lenses, it is known that focussing is automatically adjusted at the hyperfocal distance in dependence on changes in the focal length which are brought about by the zooming operation. For example, reference should be made to the Japanese Patent Publication No. 33509/1971. Further, Japanese Utility Model Publication No. 34107/1972 discloses a structure for indicating in a viewing field of a finder provided in the camera whether or not the object is within the depth of field, thereby making it possible to indicate the range in which a sharp image is assured when the zooming is carried out with the focussing ring set at the hyperfocal position. In the former case in which focussing is automatically adjusted at the hyperfocal distance in dependence on changes in the focal length brought about by the zooming operation, it is certainly possible to take photographs without fear of the image being blurred due to the zooming in a relatively wide range of the constant focal length as set. However, this solution requires a very complex structure to be provided in an otherwise relatively small space available in the fixed-tube of the zoom lens assembly which, in turn, will necessarily become very expensive. On the other hand, in the latter case where merely the allowable range for photographing at the hyperfocal distance is indicated, there may arise a possibility that the indication might be overlooked by the camera operator who has to attend to other various information given during the photographing and the corresponding manipulations. This is particularly true in the case of an 8 mm. sound movie cameras for recording simultaneously both images and sounds, in which attention of the operator is often diverted from the focussing adjustment, resulting in blurred images, because of his being devoted to other adjustments and settings such as adjustment of the input level of sound, positioning of a microphone or the like in addition to the operations required for the optical system.

SUMMARY OF THE INVENTION

It is accordingly an object of this invention to provide a zoom lens assembly for a photographic camera having a structure eliminating the necessity of focusing adjustement, in which the range of zooming is restricted to a range in which a clear sharp image can be produced by photographing at the hyperfocal distance.

It is another object of this invention to provide a zoom lens assembly, including the above structure, which can be inexpensively provided in a simplified construction.

With the above objects in view, there is proposed according to one aspect of the invention a zoom lens assembly for a photographic camera comprising a focussing ring, a zooming ring and a fixed-tube for supporting these rings as well as lenses, wherein a locking means is provided for fixedly setting the focussing ring at the hyperfocal position. The locking means additionally serves for restricting the rotational angle movement of the zooming ring to a range in which a sharp image can be produced with the focussing ring being fixedly set at the hyperfocal position.

According to an embodiment of the invention, in a photographic camera such as a movie camera provided with a zoom lens system having an aperture ratio of 1.2 and a focal length in the range of 9 mm to 27 mm, when the hyperfocal distance is set at 5 m, the zooming range may be restricted to a range defined between upper and lower limits corresponding, respectively, to focal lengths of 9 mm and 13.5 mm. Under these conditions, a depth of field in the range from about 2 m to infinity can be attained at the focal length of 9 mm with the diaphragm aperture opened fully, while a depth of field from about 3 m to 15 m can be obtained at the focal length of 13 mm in the fully opened state of the diaphragm aperture. In the case of outdoor photographing in which sufficient illumination is usually available and the diaphragm aperture is therefore selected so as to be smaller than the fully opened state, a greater depth of field than the ones described above can be attained, whereby substantially all objects in any distance can be covered by such an increased depth of field of the zoom lens assembly by setting the upper limit of the zooming range at 13.5 or 15 mm. On the other hand, in indoor photographing where illumination is usually insufficient and the diaphragm aperture has often to be fully opened, it is rare that the distance to the object is greater than 15 m. For these reasons, it is possible to produce sharp images of substantially all objects located within the indoor space at any distance from the camera.

By virtue of such advantageous features of the invention, the operator gets free from the focussing adjustment, which is the most troublesome among the adjustments required during photographing, and can concentrate his attention on the other adjustments such as those required for the recording of the sounds, whereby sharp images accompanied by well coordinated sounds can be recorded.

According to another aspect of the invention, since the restriction imposed on the zooming range can be released through a single and simple operation or manipulation, the camera can be easily changed over to the state for taking photographs of scenes located at distances out of the hyperfocal distance or to use the whole zooming range in the same manner as a conventional camera.

DESCRIPTION OF THE DRAWING

The above and other objects, features and advantages of the invention will become more apparent from the detailed description of preferred embodiments of the invention taken in conjunction with the accompanying drawing, in which.

DESCRIPTION OF THE PREFERRED EMBODIMENTS

Figure 1:
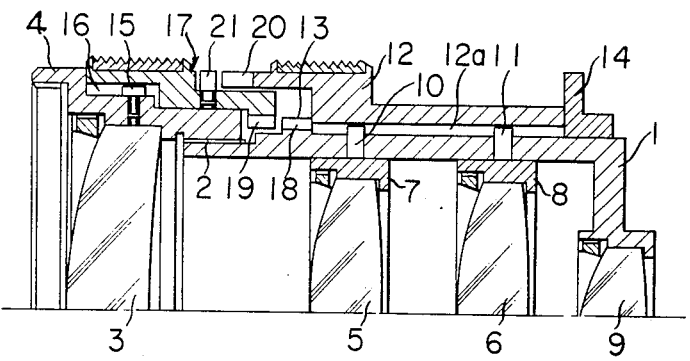
FIG. 1 shows, in a partially broken sectional view, a zoom lens assembly for a movie camera according to the invention.

Now the invention will be described with reference to the exemplary embodiments shown in the drawing. Referring at first to FIG. 1, the zoom lens assembly for a photographic camera such as a movie camera comprises a fixed-tube 1, a focussing ring 4 supported by the fixed-tube 1 in threaded engagement therewith as shown at 2 and having a focussing lens group 3, movable lens groups 5 and 6 mounted on respective lens frames 7 and 8 which are adapted to be movable relative to each other so as to vary the focal length of the zoom lens assembly, and a fixed or stationary lens 9. The movable lens frames 7 and 8 are provided with pins 10 and 11, respectively, which extend through zooming cam portions formed in the fixed-tube and engage in a linear slot 12a formed in a zooming ring 12 in such a manner that rotation of the zooming ring 12 will cause the movable lens frames 7 and 8 to be moved relative to each other by means of the zooming cams, thereby to provide a correspondingly varied focal length. It is to be noted that the zooming ring 12 is blocked against movement in the direction of the optical axis of the zoom lens assembly by means of both a limiting flange 13 and an annular member 14 provided on the fixed-tube 1.

Mounted on the focussing ring 4 is a locking device 17 having a ring-like configuration which has a linear axial slot 16 adapted to be engaged by a pin 15 on the focussing ring 4 so that the focussing ring 4 and the locking device 17 are integrally rotated on the fixed-tube 1 while the locking device 17 can be moved in the direction of the optical axis of the lens assembly. The locking device 17 is further provided with a radially inwardly extending projection 19 engageable with a notch 18 formed in the flange 13 of the fixed tube 1 and a radially outwardly extending pin 21 adapted to engage in a circumferentially extending notch 20 formed in the front edge portion of the zooming ring 12. In this connection, it should be noted that the engagement between the projection 19 of the locking device 17 and the notch 18 formed in the fixed-tube 1 is allowed to take place only when the focussing ring 4 has been set at the hyperfocal position and the locking device 17 has been moved backwardly or to the right as viewed in FIG. 1 along the optical axis. By this engagement between the projection 19 and the notch 18, the rotation of the ring 4 is arrested and hence the rotational positions of the zooming ring 12 is restricted by the engagement between the pin 21 of the locking device 17 and the notch 20 formed in the zooming ring 12.

With such a structure of the zoom lens assembly as above described, assuming that the hyperfocal distance of the zoom lens assembly is equal to 5 m and that the focussing ring 4 is set at the position corresponding to this hyperfocal distance, then an object to be photographed located at a distance in a range of about 2 m to infinity from the camera should preferably fall in the depth of field of the lens assembly under the conditions that the diaphragm aperture is fully opened and that the focal length is 9 mm. On the other hand, when the focal length is equal to 13.5 mm with the diaphragm aperture opened fully, the object distance from the camera of about 3 m to 15 m should be covered by the depth of field of the lens assembly. Under the condition that the diaphram aperture is set to f 4, an object distance ranging about 0.9 m to infinity is preferably to be covered by the depth of field of the lens system when the focal length thereof is 9 mm, while an object distance in the range of about 1.6 m to infinity is to be in the depth of field of the lens assembly at a focal length of 13.5 mm. Under such circumstances, the photographing can be effected in a satisfactory manner without requiring any focussing adjustments in the normal photographing conditions. Thus, dimensional or positional relationship between the notch 20 and the pin 21 can be so determined that the zooming ring 12 may be rotated in an angular range corresponding to a range of the focal length of 9 mm to 13.5 mm.

In the embodiment shown in FIG. 1, the ring-like or annular locking device 17 is normally at the position illustrated in the drawing. The focussing ring 4 can be thus freely adjusted depending on the distance to the object to be photographed, while the zooming ring 12 can be also arbitrarily, adjustably set at a desired focal length. On the other hand, when the photographing is to be carried out at the hyperfocal distance, the focusing ring 4 described above is at first set at the hyperfocal position and subsequently the locking device 17 is displaced backwardly, that is, to the right as viewed in FIG. 1 thereby to engage the projection 19 and the notch 18 with each other, as a result of which the locking device 17 and the focussing ring 4 will become incapable of being rotated. Additionally, since the pin 21 of the locking device 17 lies in the region of the notch 20 at that time, the rotational range of the zooming ring 12 is restricted to the range corresponding to that of the focal length of the zoom lens assembly as described hereinbefore, i.e. the range defined by limits corresponding to the focal lengths of 9 mm and 13.5 mm, in which the zooming operation can be effected in an arbitrary manner with a sharp image being constantly produced, even when no special attention is paid to the focussing and zooming.

Figure 2:
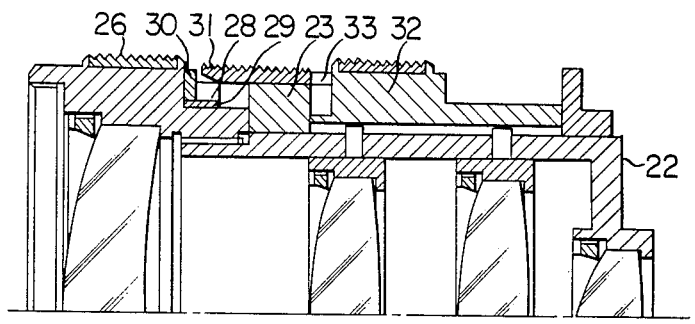
FIG. 2 is a similar view to FIG. 1 and shows another embodiment of the zoom lens assembly according to the invention.
Figure 3:
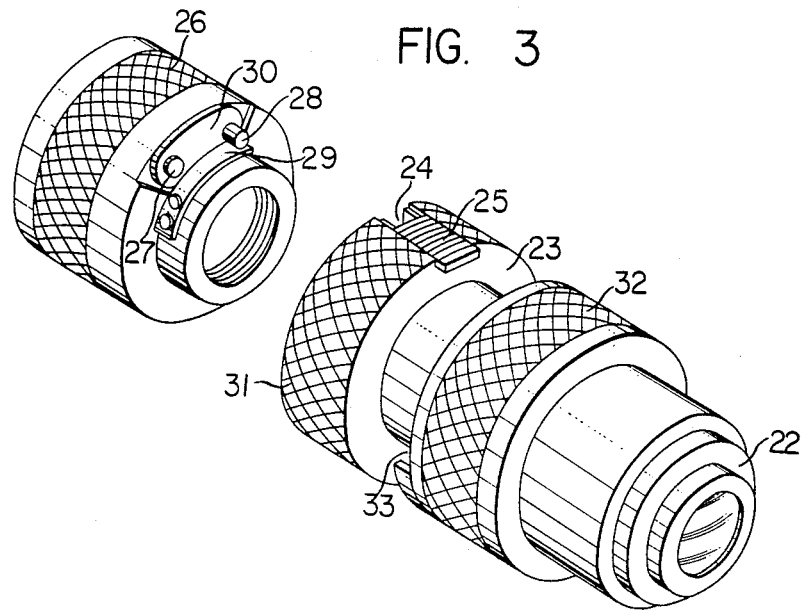
FIG. 3 is an exploded perspective view of the zoom lens assembly shown in FIG. 2.

FIGS. 2 and 3 show another embodiment of the invention. In this embodiment, the arrangement for adjusting the focal length of the zoom lens assembly is same as the one shown in FIG. 1, and therefore a further description thereof will be unnecessary. The apparatus shown in FIGS. 2 and 3 differs from that of FIG. 1 in that there is provided a ring 23 fixedly secured to the fixed-tube 22 and having a notch 24 which is usually closed by a lock device 25 fitted in the ring 23 in a suitable joint, such as a dove-tail joint so as to be slidable in the direction of the optical axis. A lever 30 is pivotally mounted on a focussing ring 26 on the rear side thereof on a stud 27. The lever 30 has a pin 28 mounted at the free end thereof and is urged radially outwardly by means of leaf spring 29 secured also to the focussing ring 26.

The pin 28 projects rearwardly from the lever 30 along the optical axis into an annular space defined in front of the front end of the ring 23 by an annular cover flange 31 mounted around the ring 23. Thus, the pin 28 usually can move freely around the fixed tube 22 within the interior of the annular cover flange 31 upon the rotation of the focussing ring 26. A notch 33 is formed in the circumference of the zoom ring 32 in a predetermined angular range, as in the case of the embodiment shown in FIG. 1.

In operation, when the lock device 25 positioned in opposition to the notch 33 of the zooming ring 32 is slidably moved in the rearward direction or to the right as viewed in FIG. 2 along the optical axis of the lens system, the notch 24 will appear in the annular cover flange 31. When the focussing ring 26 is rotated in this state, the pin 28 will engage with the notch 24 of the annular flange 31 under the infuence of the spring 29, whereby the ring 26 is set a the hyperfocal position. Additionally, the lock device 25 will project from the rear side of the ring 23 into the notch 33 of the zooming ring 32 due to the sliding movement in the rearward direction, as a result of which the rotating range of the zooming ring 32 is restricted to a predetermined angular distance defined by the notch 33 in which range a sharp image of the object to be photographed is always assured regardless of the zooming operation carried out in any arbitrary manner, within this restricted angular range.

As will be appreciated from the foregoing description, the invention has now provided a simplified focussing structure for a zoom lens assembly of a photographic camera which eliminates the need for the adjustment of the focal length of the lens system for the distance to the object to be photographed while the zooming operation is allowed to be effected in any arbitrary manner.

Although the invention has been described with reference to the preferred embodiments illustrated, only by way of example, in the drawing, it will be understood that many modifications and variations thereof will occur for those skilled in the art without departing from the spirit and scope of the invention.

What I claim is:

1. In a zoom lens assembly for a photographic camera including a focussing ring, a zooming ring and a stationary fixed tube for supporting said rings and associated lens, the improvement comprising means for making operation of the lens assembly free from the necessity of focussing for certain conditions of the lens assembly, said improvement comprising locking means for fixing said focussing ring at a hyperfocal position on said fixed tube and means cooperating with said locking means for restricting the rotation and hence the zooming range of said zooming ring, whereby a sharp image will be recorded at said hyperfocal distance of said focussing ring as set by said locking means, through the restricted zooming range, said fixed tube having a recess therein and said zooming ring having a recess therein, and said locking means comprising a first projection on said focussing ring for engagement with said recess in said fixed tube for defining said hyperfocal position, and said restricting means comprising a second projection provided on said focussing ring and engageable in said recess in said zooming ring, said recess in said zooming ring having a dimension corresponding to the restricted zooming range, said second projection being engaged in said recess in said zooming ring when said first projection engages in said recess in said fixed tube.

* * * * *